Figure 1:
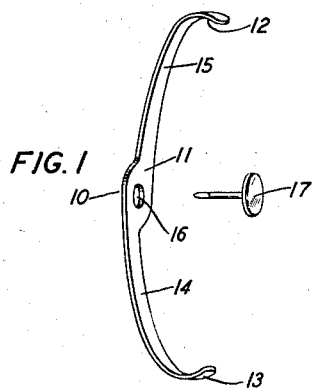

April 28, 1942.  H. F. STOVER  2,280,983

WIRE SUPPORTING CLIP

Filed March 2, 1940

INVENTOR
H. F. STOVER
BY
J. MacDonald
ATTORNEY

Patented Apr. 28, 1942

2,280,983

UNITED STATES PATENT OFFICE 2,280,983

WIRE SUPPORTING CLIP

Herbert F. Stover, Brooklyn, N. Y., assignor to Bell Telephone Laboratories, Incorporated, New York, N. Y., a corporation of New York Application March 2, 1940, Serial No. 322,040

2 Claims. (Cl. 248—71)

This invention relates to wire supporting devices and more particularly to a clip or fastener for securing inside telephone wires or cable to supporting surfaces in an inconspicuous manner.

It is the object of this invention to provide an improved device of the above character which furnishes an efficient and durable fastening means for securing telephone wires and the like to surfaces having an irregular shape.

Another object of this invention is the provision of a fastener which will adapt itself readily to various sizes of wire and cable without causing injury to the jacket.

A further object of the invention is the provision of a fastener which will conform to the shape of the supported wire or cable and lay in close contact therewith, thereby providing a supporting device which is inconspicuous and occupies very little space.

A still further object of this invention is the provision of a wire fastener which will present, when it is secured to the supporting surface and the wire or cable positioned therein, no projecting parts which might cause injury to clothing or person.

Heretofore it has been common practice when securing wires and the like to supporting surfaces, and in particular telephone wires or cables on surfaces inside of buildings, to use various types of clamping devices and fasteners which were not only unsightly in appearance but were difficult to install in locations where the surface to which the wire or cable was to be secured had an irregular profile. Furthermore, devices of this general nature were usually installed after the wire or cable was in place, consequently a considerable amount of time and labor was expended to make a neat job and keep the wire taut. These fasteners were very conspicuous and unsightly, due to the fact that even though the wire itself was installed in a groove or recess, the clamping device would necessarily be outside of the recess and would project some distance from the surface of the wire. Not only were these devices unsightly, but they also provided a hazard to clothing and person due to the fact that they presented dangerous projecting portions.

The wire fastener of this invention is composed of a single piece of metal and due to its novel shape it is easily applied without the use of any special tools or previous experience and will present a neat appearance without any projecting portions due to the fact that it firmly embraces the supported wire and holds the wire, so supported, in close contact with the supporting surface.

In accordance with this invention my improved wire fastener or clip comprises a strip of ductile metal formed into a substantially open C-shaped member having in its body portion, centrally located with respect to its ends, an aperture through which a nail or the like may be passed for securing it to a suitable support. The extending arms or prongs are out of alignment with each other and are adapted to lay side by side when bent around into firm engagement with the wire or cable.

Figure 2:
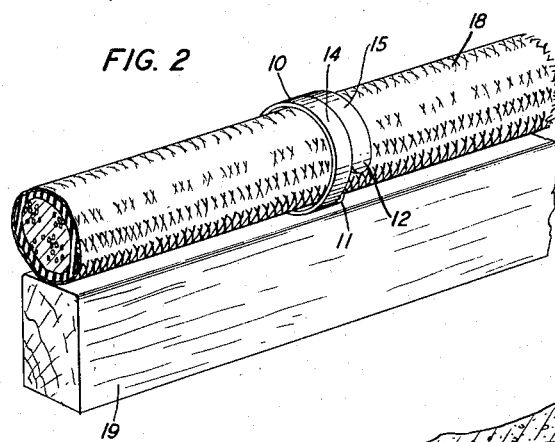
Figure 3:
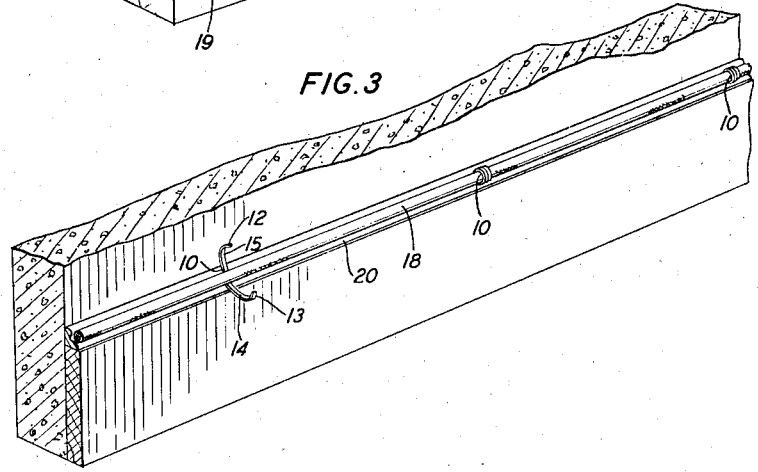

Referring now to the drawing:

Fig. 1 is an enlarged view in perspective of the fastening device of this invention with a suitable means for securing it to a supporting surface;

Fig. 2 is an enlarged view in perspective showing a fragment of inside wiring cable secured to a wood member by means of the fastener of this invention; and Fig. 3 is a fragmentary perspective view partly in section showing a telephone wire or cable secured in the recess of a molding by means of the improved fastener of this invention, one of said fasteners shown secured to the molding but not bent around the cable.

As shown in the accompanying drawing, and with particular reference to Fig. 1, the fastener or clip of this invention comprises a member 10 of ductile metal substantially C-shaped in configuration and having a body portion 11 centrally located with respect to the ends 12 and 13 of the arms 14 and 15. Located in the body portion 11 is an aperture 16 through which the nail 17, or any other suitable means, may pass to secure the member 10 to its supporting surface.

As shown in Figs. 1 and 3 the arms 14 and 15 are out of alignment with respect to each other and have their end portions 13 and 14 bent around a radius substantially smaller than that of the arms themselves. This construction permits the ends 13 and 14 to be bent around and firmly embrace the cable or wire 18 and be positioned adjacent to and parallel with the opposite arm.

By referring to Fig. 2 it will be noted that the end 12 of the arm 15 is in juxtaposition with respect to the arm 14, thereby providing the fastener 10 with a smooth unobstructed outer surface while firmly embracing the cable 18, which in this instance is secured to the wood member 19 which may be a door jamb, casing or the like.

In Fig. 3 the cable 18 is shown secured in the recess or groove of a base-board molding 20 by means of the fastener 10.

From the foregoing it will be observed that the fastener of this invention is not only inexpensive to manufacture and install, but is one that will adapt itself readily to various sizes of wire and cable, thereby reducing to a minimum the number of fasteners which must be provided to accommodate the various sizes of wire and cable.

A considerable saving in time and labor will be effected due to the fact that these fasteners may be secured in position along the desired cable run prior to the insertion of the cable and no special tools or experience is required.

While there is shown and described herein the preferred embodiment of my invention, it is to be understood that it is not limited or confined to the precise details of construction herein disclosed as various modifications may be made without departing from the spirit of the invention.

What is claimed is:

1. A fastener for securing cable to supporting surfaces comprising a centrally apertured metal body portion, a pair of arms integral with said body portion and extending in opposite directions in offset relation with each other, both of said arms gripping the cable when bent therearound, the ends of said arms being bent inwardly around a sharp radius to firmly grip the surface of the cable, and means passing through the aperture in the body portion of said fastener for securing it to a supporting surface.

2. A fastener for securing a cable to a supporting surface comprising a centrally apertured C-shaped member having a pair of arms extending in opposite directions and out of alignment with each other, a cable to be supported, the end portions of said arms being bent around a sharp radius to firmly grip said cable on the surface thereof when said arms are bent around the cable and positioned side by side, and means passing through said aperture for securing the fastener and the cable embraced thereby to a supporting surface.

HERBERT F. STOVER.